(12) United States Patent
Shi et al.

(10) Patent No.: US 11,851,333 B2
(45) Date of Patent: Dec. 26, 2023

(54) METHOD FOR STEPWISE EXTRACTION OF SILICA AND HYDROXIDE FROM SILICATE SUBSTANCES

(71) Applicants: INNER MONGOLIA UNIVERSITY OF TECHNOLOGY, Inner Mongolia (CN); Inner Mongolia Zhanhua Technology Co., Ltd., Inner Mongolia Autonomous R (CN)

(72) Inventors: Zhiming Shi, Inner Mongolia (CN); Wendi Yin, Inner Mongolia (CN); Hua Yan, Inner Mongolia (CN); Minmin Zhang, Inner Mongolia (CN); Tao Liu, Inner Mongolia (CN); Cunquan Wang, Inner Mongolia (CN)

(*) Notice: Subject to any disclaimer, the term of this patent is extended or adjusted under 35 U.S.C. 154(b) by 173 days.

(21) Appl. No.: 17/331,652

(22) Filed: May 27, 2021

(65) Prior Publication Data
US 2022/0267159 A1     Aug. 25, 2022

(30) Foreign Application Priority Data

Feb. 24, 2021 (CN) ......................... 202110207136.X

(51) Int. Cl.
| | | |
|---|---|---|
| *C01B 33/12* | (2006.01) | |
| *C25B 1/20* | (2006.01) | |
| *C25B 15/02* | (2021.01) | |

(52) U.S. Cl.
CPC .............. *C01B 33/128* (2013.01); *C25B 1/20* (2013.01); *C25B 15/02* (2013.01); *C01P 2002/72* (2013.01); *C01P 2006/80* (2013.01)

(58) Field of Classification Search
None
See application file for complete search history.

(56) References Cited

U.S. PATENT DOCUMENTS 10,221,491 B2 * 3/2019 Blunn ...................... C25B 1/46
2012/0148461 A1 * 6/2012 Rosenberg ................ C22B 7/04
422/604

FOREIGN PATENT DOCUMENTS

JP     2002173790 A  *  6/2002

OTHER PUBLICATIONS

Machine translation for JP 2002173790 (Year: 2002).*

* cited by examiner

*Primary Examiner* — Colin W. Slifka
*Assistant Examiner* — Michael Forrest
(74) *Attorney, Agent, or Firm* — Patshegen IP; Moshe Pinchas

(57) ABSTRACT

A method for stepwise extraction of silica and hydroxide from silicate substances. The silicate substances are leached by chlorine-containing inorganic acids, and the hydroxides are extracted step by step from the leaching liquor by electrochemical deposition method; The raw material of the powder is put in the reactor, inorganic acids, water-soluble alcohol and water are added as the leaching liquor, heated and reacted under the condition of 0.1 MPa or more, and the acidic multi-ion mixed solution and filter residue are obtained by filtration. The acidic multi-ion mixed solution is heated and boiled, and the silicon-containing volatile components are collected, decomposed and deposited in the collector; The deposited volatile components is dried to obtain high purity silica powder; The filter residue is washed and dried to obtain silica; The hydroxides are extracted from the acidic multi-ion mixed solution by electrochemical deposition method.

10 Claims, 2 Drawing Sheets

METHOD FOR STEPWISE EXTRACTION OF SILICA AND HYDROXIDE FROM SILICATE SUBSTANCES

FIELD OF THE INVENTION

The invention relates to the technical fields of resource recycling, chemical industry, materials, minerals and metallurgy. Specifically, a method for efficiently dissolving low-grade silica-containing silicate substances and extracting silica and hydroxide from the silicate substances is proposed.

BACKGROUND OF THE INVENTION

Most inorganic solid wastes contain a huge amount of silicon oxide, aluminum oxide, iron oxide, calcium oxide and other components, such as coal fly ash, coal gangue, metallic or non-metallic tailings, red mud and so on. Extracting high-purity compounds from these substances is an effective method for resource regeneration. It not only makes full use of effective resources, but also greatly reduces environmental pollution due to the huge amount of industrial waste. In addition, natural inorganic substances such as desert sand, river sand, and clay are purified to prepare high-purity compounds such as silica oxide, alumina oxide, iron oxide, etc., so as to meet the quality requirements of industrial production and make full use of natural resources.

High-purity silicon oxide is an important industrial raw material for the manufacture of optical glass, optical fiber, functional materials, additives, and important components in the electronics industry.

At present, there are many methods for synthesizing high-purity silicon oxide. Among them, the gas phase method uses high-purity silicon tetrachloride, silicon tetrafluoride and methyl silicon trichloride as raw materials, which are hydrolyzed in a oxyhydrogen flame at high temperature to produce silica particles. The particles are then quenched, aggregated, separated, and disacidified to obtain high-purity silicon oxide; the methods of preparing high-purity silica by hydration-gelation method include: using acid or alkali to decompose the reactant to form silica sol, adjusting the pH value with alkali or acid, filtering and purifying to form silica gel; adding acid solution to water glass solution to obtain the reaction liquid, the pH is increased to 9-13 with alkali to prepare a silica sol, and add the aqueous solution to form a silica gel. The reaction solution can also be evaporated or concentrated to prepare a silica sol; silica fume is added to a 65° C. solution of caustic soda, and ammonia is added to adjust the pH to 9-10 to prepare a silica sol; The silica gel is prepared by mixing the diluted water glass and dilute sulfuric acid; the purified silica is obtained after the silica sol is dried. In addition, after a long time reaction of the micron-sized silica, water, hydrochloric acid, fluoride, and mineralizer, the mixture is cooled and filtered. The filtrate is treated with limewater, and then washed with deionized water to neutrality and dried to obtain the purified silica. All above methods use high-purity secondary raw materials, and the cost is high.

On the other hand, the amount of industrial waste discharged by mining, electric power, metallurgy and other enterprises is huge and takes up a lot of land, causing serious environmental pollution. It is urgent to develop resource regeneration methods with advantages of efficient, high additional value, low cost and no secondary waste. These inorganic solid wastes and natural sands contain a large amount of silica components, such as coal fly ash, desert sand, coal gangue, red mud, metallic or non-metallic tailings, etc. Extracting high-purity compounds including silicon oxide from these substances is the development direction of comprehensive utilization of resources, which meets the requirements of building an environment-friendly, resource-saving society and ecological environment protection.

At present, the comprehensive utilization technologies for coal fly ash, coal gangue, metallic tailings, etc. mainly include alkali method and acid method, which are used to extract the compounds such as aluminum oxide and silicon oxide. In the treatment of a huge amount of coal fly ash, the alkaline method mainly uses alkaline substances such as calcium carbonate or sodium hydroxide and coal fly ash to be calcined at a high temperature above 1200° C., so that the aluminum-containing compounds in the coal fly ash can be converted into soluble aluminate and insoluble silicate. The amount of calcium silicate slag formed after precipitation and extraction of aluminum hydroxide from aluminate solution is huge, and its recycling is a new problem. There are also reports on the further extraction of high purity silicon oxide from calcium silicate slag, and the process is more complicated.

Alkaline sintering and stepwise leaching are used to jointly extract Ga, Nb, RE and other rare metals in coal fly ash. A large amount of sodium carbonate is added to coal fly ash and sintered at 860° C., Ga is extracted by water immersion method, and RE is extracted by acid leaching method. Ion exchange resin and $NH_4Cl$ solution are used to adsorb and desorb Ga in the Ga-rich water-leaching filtrate at 40° C., and the adsorption rate of Ga is also low. A series of processes such as adding sodium carbonate to roasting in molybdenum tailings powder, leaching with ammonia water, using $HNO_3$ to adjust the pH value of the ammonia leaching solution, precipitation and dissolution are used to extract Mo from molybdenum tailings.

The direct acid leaching method uses acidic solution to directly extract the aluminum components in coal fly ash at high temperature. The leaching solution can be converted into aluminum chloride, aluminum sulfate, etc. through separation, purification, and crystallization procedures; aluminum hydroxide can also be precipitated by alkali neutralization method. These compounds are calcined to obtain alumina. The process is relatively simple, but the acid consumption is large, and the waste liquid treatment volume is large. In addition, the coal fly ash is mixed with sulfuric acid for high-temperature roasting, and then concentrated sulfuric acid or hydrochloric acid is used to extract the aluminum-containing component. The precipitation method, adsorption method, extraction method and ion exchange method are used to recover the metal elements such as gallium, vanadium, and lithium in the leaching solution. In addition, under high temperature and halogen atmosphere, the reduction reaction of carbon and coal fly ash generates volatile metal halides.

After the coal gangue powder is roasted at 700-900° C., it is reacted with hydrochloric acid, and the filter residue reacts with HF to form $SiF_4$, which is hydrolyzed in ethanol solution to obtain a precipitate. After washing, silicon oxide powder (white carbon black) is obtained. The filter residue can also be added with sodium hydroxide solution to continue the reaction, and the white carbon black can be obtained through filtration, salting out, and drying. The filtrate is added with an alkalizing agent to polymerize $AlCl_3$ and $FeCl_3$ into aluminum ferric chloride.

One of the methods to prepare silica from coal fly ash is to mix coal fly ash and $Na_2CO_3$ uniformly, finely grind, and react at 800-900° C. The reaction product is acid-leached with hydrochloric acid with a concentration of 3.14 mol/L, and the alkali after the impurities is filtered to turn the sol into gel, filtered and dried again to obtain $SiO_2$ with a purity of more than 98%. The coal gangue powder is roasted at 700-900° C. and reacted with hydrochloric acid. The filter residue reacts with HF to generate $SiF_4$, which is hydrolyzed in ethanol solution to obtain a precipitate. After washing, silicon oxide powder (white carbon black) is obtained. The filter residue can also be added with sodium hydroxide solution to continue the reaction, and white carbon black can be obtained through filtration, salting out, and drying. The quartz ore is calcined at high temperature, quenched with water, then removed impurities, dried, pulverized, and mixed with a certain amount of chlorinating agent (carbon tetrachloride, hydrogen chloride, chlorine, ammonium chloride, trichloroethylene) and then roasted at 900° C. for 60 minutes. After the chlorinated silica powder is soaked in a mixed liquid of HCl, $HNO_3$, HF for more than 40 hours, the chlorinated silica powder is cleaned to neutrality with electrodialysis water or deionized water, and then dried at 200-900° C. to obtain silicon oxide powder. The silicon-rich iron tailings powder that has been dissolved and dealuminated by hydrochloric acid is calcined and reacted with excess dilute hydrochloric acid and filtered, the filter residue and NaOH are mixed and calcined again, then poured into water, heated, stirred and filtered. NaCl and hydrochloric acid are added to the filtrate, the pH value is adjusted to 8-9, the flocculent precipitate is ultrasonically washed, and dried to obtain white carbon black. The silicon-rich iron tailings powder that has been dissolved and dealuminated by hydrochloric acid is calcined and reacted with excess dilute hydrochloric acid and filtered, the filter residue and NaOH are mixed and calcined again, then poured into water, heated, stirred and filtered. NaCl and hydrochloric acid are added to the filtrate, the pH value is adjusted to 8-9, the flocculent precipitate is ultrasonically washed, and dried to obtain white carbon black.

In addition, in order to obtain the highest leaching rate of aluminum oxide, a mixture of HCl with a concentration of 4.95 mol/L and HF with a concentration of 4.93 mol/L is used to leach coal fly ash, and the best leaching condition is that the mass ratio of liquid to solid is (4.5~5.0):1, and the leaching temperature is 90~95° C. for 3 h. It was also found that HF promotes the leaching of mullite, which will also cause the leached $Al^{3+}$ to generate aluminum fluoride, thereby reducing the leaching of $Al_2O_3$, and at the same time the leaching of non-mullite phase $SiO_2$ is increased to generate $SiF_6^{2-}$ which increases the environmental burden, so the leaching process strictly controls the HF concentration.

It can be seen from the above that the disadvantages of extracting silicon oxide from coal fly ash, coal gangue and iron tailings by acid method or alkali method are the huge consumption of alkaline and acidic substances and the difficulty in recycling, difficult water treatment, and a huge amount of secondary waste slag discharged, resulting in new solid waste treatment problems. Specifically, the treatment methods and disadvantages of leaching coal fly ash, coal gangue, iron tailings solution by acid method are: ① Aluminum chloride, aluminum sulfate, etc. are obtained through crystallization, and alumina is obtained after calcination, but serious hydrochloric acid or sulfuric acid gas is formed, the consumption of acid is huge; ② the pH value of the acid leaching solution is adjusted by adding alkaline solution to separate compounds, which requires the addition of a large amount of alkaline substances, and neutralization of acid and alkali causes waste of acid solution and difficulties in water treatment; ③ The acid method of extracting alumina avoids a large amount of silicon from entering the solution, but also causes more residual high-silicon slag, resulting in a new solid waste treatment problem; ④ When $Fe^{3+}$ enters the acid leaching solution, the pH range of $Al^{3+}$ and $Fe^{3+}$ deposition overlaps, and it is not easy to control the pH fluctuation of the solution by adding alkaline substances, which greatly increases the difficulty of separation and seriously affects the purity of alumina and ferric oxide; Other methods for separation of $Fe^{3+}$ and $Al^{3+}$ have been reported in the literature, such as recrystallization and organic matter extraction. However, the process becomes complicated and the cost increases obviously.

INVENTION CONTENT

Therefore, the technical problem to be solved by the invention is to provide a fine separation method of inorganic silicate substances with short process flow, high efficiency and small increment of secondary solid waste, that is, a method for stepwise extraction of silica and hydroxide from silicate substances. This method solves the problem that when silicon oxide is extracted from inorganic solid waste, natural sand and other materials with high silicon oxide content, the consumption of alkaline and acidic substances is huge, the recovery is difficult, the water treatment is difficult, the cost is high, and the amount of secondary waste residue discharged is huge, new solid waste treatment and other problems are generated, so that industrial solid waste and natural idle resources can be fully utilized to save mineral resources and protect the ecological environment. The invention is suitable for the fine separation of inorganic solid wastes such as coal fly ash, coal gangue, red mud, metallic tailings, etc., and the purification and separation of natural materials such as desert sand, river sand, clay, etc. The extracted compounds have high purity and can be further processed or directly used as functional powder materials, as well as raw materials for ceramics, metal electrolysis and other industries.

In order to solve the above technical problems, the present invention provides the following technical solutions:

A method for stepwise extraction of silica and hydroxides from silicate substances. The silicate substances are leached using a chlorine-containing inorganic acid, and the hydroxide is obtained by stepwise extraction from the leaching solution by electrochemical deposition.

The above-mentioned method for stepwise extraction of silica and hydroxide from silicate substances includes the following steps:

Step A: The raw material of silicon-containing inorganic solid waste or silicon-containing natural sand powder is putted into the reactor, the mixed acid composed of inorganic acid X, inorganic acid Y, inorganic acid Z, water-soluble alcohol and water is added as the leaching solution, heated and reacted under the condition of greater than or equal to 0.1 MPa, after the reaction, filtered to obtain the acidic multi-ion mixed solution and filter residue;

Step B: The acidic multi-ion mixed solution obtained in step A was heated and boiled, the silicon-containing volatile components are collected with a collector, the silicon-containing volatile components are decomposed and deposited in the collector, and the remaining acidic multi-ion mixed solution is cooled for standby use;

Step C: The amorphous silica dioxide decomposed and deposited in the collector is dried to obtain high purity silica powder;

Step D: Wash and dry the filter residue obtained in step A to obtain silica;

Step E: The acid multi-ion mixed solution cooled in step B is extracted by electrochemical deposition method to obtain the hydroxide.

The method for stepwise extraction of silica and hydroxide from silicate substances, in step A: the silicon-containing inorganic solid waste is one or a combination of coal fly ash, coal gangue, red mud, metallic tailings and non-metallic tailings; The natural sandy soil is one or a combination of desert sand, river sand and clay.

The method for stepwise extraction of silica and hydroxide from silicate substances, in step A: the mass ratio of the powder raw material, inorganic acid X, inorganic acid Y, inorganic acid Z, water-soluble alcohol, and water is (10-15):(25-35):(6-12):(5-10):(5-10):(15-35).

The method for stepwise extraction of silica and hydroxide from silicate substances, in step A: the inorganic acid X is hydrochloric acid, and the inorganic acid Y is hydrofluoric acid, the inorganic acid Z is sulfuric acid, the water-soluble alcohol is ethanol; the concentration of the hydrochloric acid is greater than or equal to 36 wt %, the concentration of the hydrofluoric acid is greater than or equal to 40 wt %, and the concentration of the sulfuric acid is greater than or equal to 95 wt %; The ethanol is anhydrous ethanol, and the ethanol content is greater than or equal to 99 wt %.

The method for stepwise extraction of silica and hydroxide from silicate substances, in step B, in the cooled acid multi-ion mixed solution: metal ions are two or more of tin ion, titanium ion, rare earth ion, trivalent iron ion, aluminum ion, chromium ion, zinc ion, ferrous ion, manganese ion, magnesium ion and calcium ion, nonmetallic ion is silicon-containing ion;

In step E, the acid multi-ion mixed solution is electrolyzed. During the electrolysis process, the cathode releases hydrogen from beginning to end, and the anode releases chlorine from beginning to end, so that the pH of the acid multi-ion mixed solution gradually rises; as the electrolysis proceeds, the metal ions in the acid multi-ion mixed solution are sequentially deposited in the form of hydroxides in the vicinity of the cathode. The hydroxide precipitates produced in each electrolysis stage are separated separately, and then the filtrate is further electrolyzed until all the metal ions in the acidic multi ion mixed solution are precipitated in the form of hydroxide; finally, the temperature of the electrolyte is raised, so that the silicon-containing ions are precipitated in the form of silicic acid.

The method for stepwise extraction of silica and hydroxide from silicate substances, before starting to deposit metal ions, first electrolysis is carried out at a voltage of 15-25V to a pH of 0.2-0.5.

The method for stepwise extraction of silica and hydroxide from silicate substances according to claim 7, characterized in that, when the pH value reaches 0.2-0.5, a reverse voltage of 10V is applied and maintained for 5 minutes to make the cations gather at the other end of the electrode, then the voltage is reduced to less than or equal to 3.0V, so that the electrochemical reaction is basically in a stagnant state, the applied voltage continues to remain unchanged, and the original voltage direction is adjusted back to the state of preparation for deposition.

The method of stepwise extraction of silica and hydroxide from silicate substances: when depositing titanium ions, they are electrolyzed at a voltage of 4.0-5.0V to a pH of 0.8-1.2 and kept for 10 minutes, the resulting precipitate is titanium hydroxide;

When depositing rare earth ions, they are electrolyzed at a voltage of 4.5-5.5V to a pH of 1.0-1.3 and kept for 15 minutes, and the resulting precipitate is rare earth hydrate;

When depositing trivalent iron ions, they are electrolyzed at a voltage of 4.0-7.5V to a pH of 2.6-6.5 and kept for 10-30 minutes, and the resulting precipitate is iron hydroxide;

When depositing aluminum ions, they are electrolyzed at a voltage of 5.5-8.5V to a pH of 5.2-6.5 and kept for 10-30 minutes, and the resulting precipitate is aluminum hydroxide;

When depositing ferrous ions, they are electrolyzed at a voltage of 6.5-8.5V to a pH of 8.0-9.0 and kept for 25 minutes, and the resulting precipitate is ferrous hydroxide;

When depositing calcium ions, magnesium ions or manganese ions, they are electrolyzed at a voltage of 8.0-10.0V to a pH of 11.0-12.7 and kept for 5-10 min, and the resulting precipitate is calcium hydroxide, magnesium hydroxide or manganese hydroxide.

The method for stepwise extraction of silica and hydroxide from silicate substances, step E further comprises the following content: The precipitates are centrifuged and washed three times, then calcined at 650° C. for three hours to obtain the corresponding oxides;

The temperature of the electrolyte during the electrolysis is 50-100° C.;

The precipitation temperature of the silicic acid precipitation is 80-100° C., and the precipitation time is 10-60 min;

The method for stepwise extraction of silica and hydroxide from silicate substances, in step A: the pressure inside the reactor is 0.1-0.3 MPa, the reaction temperature inside the reactor is 90-140° C., and the reaction time is 0.5-2 hours;

In step C, the drying temperature is 150° C.;

In step D, the drying temperature is 150° C.

The process principle of this method:

Industrial solid waste and natural sandy soil are mainly composed of feldspar, kaolinite silicate or aluminosilicate with complex structure formed by alkali metals (including quartz (crystal and amorphous), mullite, iron-titanium oxide, carbonate, magnesium, calcium, potassium, sodium, etc.), alkaline earth metal ions and silicon, aluminum, etc., and the composition is very complex and unstable. Naturally formed quartz also solutionizes a small amount of magnesium, calcium, potassium, sodium, aluminum, and iron. Hydrochloric acid is highly corrosive to iron-titanium oxides, carbonates, some silicates, and aluminosilicates, and can dissolve these substances very well. However, the dissolution rate of these substances no longer increases when hydrochloric acid is added in a very excessive amount. One of the reasons is that hydrochloric acid is very weakly corrosive to quartz and some silicates such as mullite (aluminum silicate). The addition of hydrofluoric acid has a great influence on the dissolution of powder raw materials; adding HF can destroy the Al—Si bond in mullite and other compounds, and also has a certain effect on destroying the Si—Si bond of quartz, so it can effectively dissolve mullite, quartz and other phases. However, excessive hydrofluoric acid will form a large number of fluoride ions, fluoroaluminate and fluorosilicate ions, which will react with free metal ions to form complex multicomponent complexes, such as $CaAlF_5$, $CaSiF_5$, or fluorides of Al, Na, Fe, Mg, etc., as well as fluorinated complexes formed by these fluorides with crystal water. They tend to form precipitates, resulting in a decrease in the content of silicon and metal ions in the solution, and a decrease in the purity of the acid leaching residue. Therefore, the amount of hydrofluoric acid added should be moderate. In addition, adding an appropriate amount of sulfuric acid to the mixed acid solution has the effect of polybasic acid compounding, which can obviously help dissolve, and also has a good role in promoting the subsequent evaporation and deposition of amorphous silicon oxide. The concentration of the solution also has a greater impact on the dissolution effect and the formation of fluoride and silicon-rich compound precipitation.

In order to obtain higher temperature, the liquid in the reactor can be adjusted by increasing the vapor pressure. Stirring, heating and pressurization can also significantly improve the dissolution effect, but too high temperature is easy to cause more silicate precipitates. Compared with the prior art, the concentration of hydrochloric acid in the invention is relatively high, while the concentration of hydrofluoric acid is relatively low, especially the dosage of hydrofluoric acid is related to the content of quartz. Only when the dosage of hydrochloric acid, hydrofluoric acid and sulfuric acid is reasonable, the concentration and the liquid temperature are suitable, the dissolution effect is good.

As the temperature of the acidic multi-ion mixed solution rises or even after boiling, the components with lower boiling points such as $H_2O$, HF, HCl, $SiF_4$, $SiCl_4$, $H_2SiF_6$ and $H_2SiO_3$ are volatilized or evaporated into gases. The silicon-containing gas decomposes and deposits amorphous or crystalline silicon oxide in the collector. Amorphous silica, depending on the pressure of the reaction vessel, may exhibit gel or flocculent precipitation. The greater the pressure of the reactor, the greater the speed of the airflow entering the collector, and the easier the dehydration and decomposition will proceed, which tends to form flocculent precipitates; on the contrary, colloidal substances are formed. Appropriate addition of ethanol can not only improve the volatilization and evaporation effects of silicon-containing gas, but also promote the dehydration and decomposition of silicon-containing gas. The gel or flocculent precipitate is dried and further dehydrated to obtain silica powder with a purity higher than 99.8%. The hydrogen chloride and hydrogen fluoride in the gas stream are condensed into hydrochloric acid and hydrofluoric acid in the collector and returned to the reactor to continue to participate in the reaction.

There are still undissolved residues in the powder raw materials impregnated by the mixed solution. After they are washed and dried, the purity of silicon oxide is also higher than 90.0%. The specific components and residual amount are not only related to the mixed acid solution, but also related to the type of dissolved matter and the content of silicon oxide crystals in each powder raw material.

The invention uses hydrochloric acid or hydrochloric acid mixed acid to dissolve inorganic solid waste such as coal fly ash, coal gangue, red mud, metallic tailings, and dissolve natural materials such as desert sand, river sand, clay, etc. to obtain a chlorinated inorganic acid mixed solution. After the silicon oxide is extracted, the chlorine-containing inorganic acid mixed solution containing silicon, aluminum, iron, magnesium, calcium, titanium, and rare earth plasma is used as the object of separation and purification. The electrochemical stepwise deposition method is used to utilize the pH value change law and the deposition characteristics of each ion during the electrochemical reaction of the solution: (1) $H^+$ precipitation in the solution reduces the $H^+$ ion concentration and causes the pH value to rise; (2) Different ions have their own deposition, the electrochemical reaction process is adjusted by adjusting the electrolysis voltage, and the pH value of the cathode solution is accurately adjusted and stabilized in a specific range, so that specific ions are precipitated in the form of hydroxide; the compounds such as aluminum hydroxide, iron hydroxide, magnesium hydroxide, calcium hydroxide, titanium hydroxide, rare earth hydroxide and silicic acid are respectively extracted from the solution, and the type is related to the type of the dissolved substance.

The electrochemical reaction and the deposition process of each compound in the acidic multi-ion mixed solution of the present invention are: under the action of an electric field, the hydrogen ions and chloride ions in the solution are first electrolyzed, and $Cl_2$ gas is precipitated at the anode, and at the cathode, polyvalent ions with higher electrode potentials such as $Ce^{4+}$, $Ti^{4+}$, $Fe^{3+}$, etc. (the types of which are related to the dissolved substances) are reduced to low valence ions ($Ce^{3+}$, $Ti^{3+}$, $Fe^{3+}$, etc.). They are easily oxidized in the solution to regenerate polyvalent ions, and $H_2$ gas is precipitated at the same time. The precipitation of $H^+$ ions increases the pH of the solution, which is higher near the cathode. The hydroxide with the lowest pH and least solubility will deposit first near the cathode. After all the $H^+$ ions in the acid are precipitated, $H^+$ ions in the water begin to precipitate $H_2$ gas, and the pH value of the solution continues to increase, forming an alkaline solution. Therefore, specific hydroxides can be deposited within the pH range where they are deposited. Finally, the temperature of the liquid is increased to boil and the water is discharged, and the saturation of $(SiO_4)^{2+}$ ions increases and precipitates as flocculent silicic acid. After the entire electrolysis process, the ions in the solution can be deposited separately, so as to achieve the purpose of extracting high-purity compounds from the mixed solution. In addition, those ions deposited under alkaline conditions, such as $Ca^{2+}$, $Mg^{2+}$, $Fe^{2+}$, etc., can also be deposited by constructing an electrolytic system. The newly constructed electrolysis system includes salt bridges or the use of cation exchange membranes and inert electrodes. The negative and positive electrolyte s are water and the aforementioned mixed solution respectively. By applying voltage to control the pH range of the cathodic aqueous solution, $Fe(OH)_2$, $Mg(OH)_2$ and $Ca(OH)_2$ can be deposited sequentially. The reaction process is as follows: the cations in the anode mixed solution migrate to the cathode aqueous solution through the salt bridge or anion isolation membrane, and $Fe^{3+}$ preferentially obtain electrons at the cathode to be reduced to low valence $Fe^{2+}$ ions. At this time, the pH value of the aqueous solution is just in the deposition range of $Fe^{2+}$ ions and $Fe(OH)_2$ is produced; $H^+$ is reduced to form hydrogen, which leads to the increase of pH value. After the deposition of $Fe(OH)_2$ is completed, $H^+$ in the water is reduced to precipitate hydrogen, and the pH value continues to increase. At higher pH values, $Ca^{2+}$ and $Mg^{2+}$ plasma deposit compounds such as $Ca(OH)_2$ and $Mg(OH)_2$. This electrolysis process can be inserted into the aforementioned main electrolysis process at any time.

Due to the strong corrosiveness of acid liquid, all the surfaces of reaction kettles, pipes, and detection instruments in contact with acid liquid need to be treated with anticorrosion. The electrolytic electrode of the invention adopts graphite or platinum inert electrode, and performs anticorrosive coating or lining treatment on the instrument and equipment, so as to reduce the corrosion of the instrument and equipment by acid and increase the service life of the equipment.

The technical solution of the invention achieves the following beneficial technical effects:

The following beneficial effects have been achieved in the process of dissolving silicate substances and extracting high-purity silicon oxide:

① Inorganic solid wastes, such as coal fly ash, coal gangue, metallic or non-metallic tailings, red mud, and natural sandy soil, such as desert sand, river sand and clay, are used as raw materials to prepare high-purity silicon oxide. In addition, high-purity oxides are further extracted from these silicate materials containing low-grade silicon. This method can significantly reduce the amount of residual slag, reduce the use of industrial waste, and reduce the environmental pollution caused by industrial waste.

② Industrial solid waste and idle natural resources are fully utilized, mineral resources are saved, and land resources and ecological environment are protected.

③ Since strong alkaline substances are not added, no other new waste residue is generated, so that the waste residue does not increase.

④ Under the conditions of reasonable control of the ratio and temperature of the mixed acid solution, the dissolution rate of raw materials is high, and the weight reduction effect is significant.

⑤ The hydrochloric acid, hydrofluoric acid and sulfuric acid condensed in the collector are returned to the reactor to continue to participate in the reaction without discharge, and the environmental protection effect is good.

⑥ The purity of amorphous silica powder deposited by evaporation and decomposition is high, reaching more than 99.8%; the content of silica in the undissolved residue is also higher than 90.0%, and its specific content and residual amount are related to the type of dissolved substances.

⑦ The reaction takes place at 90-140° C. and does not require high-temperature calcination, which has a good energy-saving effect.

⑧ The tail liquid after the extraction of silicon oxide can be further separated from aluminum, iron, magnesium, calcium, and titanium plasma by electrochemical methods to form their hydroxides or oxides. The waste liquid is precipitated and purified into a fluorine-containing solution, which can also be repeated Use, so as to finally realize the efficient and high value-added utilization of inorganic solid waste and natural resources.

During the stepwise extraction of different hydroxides in the acidic multi-ion mixed solution, the following beneficial effects have been achieved:

① The chlorine-containing inorganic acid leaching solution used in the present invention can contain more silicon, which is precipitated in the form of silicic acid (silicon hydroxide) at the end of electrolytic deposition, so as to reduce the problem of excessive residual high silicon slag after the coal fly ash and coal gangue are dissolved by acid and alkali, and further purification is difficult. This method can process natural substances such as desert sand and river sand. On the one hand, the quartz can be purified, and on the other hand, high-purity hydroxides such as aluminum hydroxide, iron hydroxide, magnesium hydroxide and other compounds can be extracted, so as to make full use of natural resources.

② In the present invention, the pH value adjustment of the acidic solution does not rely on the conventional method of adding a large amount of alkaline substances (such as sodium hydroxide), but uses the characteristics of the pH value change during the electrochemical reaction of the chlorine-containing inorganic acid solution, that is, the electrolysis voltage is used to adjust the electrochemical reaction process and accurately control the pH range of the solution near the cathode, thereby precipitating high-purity hydroxides, avoiding the secondary solid waste treatment problems and water treatment problems caused by large amounts of alkaline substances.

③ In the present invention, when the electrolysis starts, $Fe^{3+}$ is reduced to a low valence $Fe^{2+}$ by preferentially obtaining electrons at the cathode, and the low valence $Fe^{2+}$ is re-oxidized to $Fe^{3+}$. When the applied voltage is controlled at a low level, the rate of $H^+$ ions evolving hydrogen at the cathode is low, and the rate of pH rise is low, so it is easy to control, and it can ensure that the pH value of the solution near the cathode is stably lower than the pH value of $Al^{3+}$ deposition. Most $Fe^{3+}$ ions can be separated from the mixed solution separately to obtain high-purity $Fe(OH)_3$. *In the present invention, the precipitation of polyvalent metal ions, such as $Fe(OH)_3$, is also a slow process, and the pH value of the entire deposition process in controllable, and no sudden increase occurs. At this time, as long as the applied voltage is controlled to make the pH value of the cathode solution lower than the pH value of the $Al^{3+}$ deposition, high-purity $Fe(OH)_3$ can be deposited.* Moreover, the large amount of $Fe(OH)_3$ precipitation is also beneficial to the subsequent improvement of the purity of aluminum hydroxide. If a conventional alkaline solution is used to deposit $Fe(OH)_3$, the pH value of the mixed solution in the contact area will suddenly rise at the moment the alkaline solution is added, and those ions with similar or higher pH value of the hydroxide deposition, such as $Al^{3+}$, $Cr^{3+}$, $Zn^{2+}$, etc., will simultaneously precipitate hydroxide precipitates, thereby reducing the purity of $Fe(OH)_3$.

④ In the present invention, by controlling the applied voltage and electrolysis time, the pH value of the chlorinated inorganic acid mixed solution is increased from low to high and stabilized in a specific pH range, so that a hydroxide or a mixture of hydroxides containing a single ion with high purity can be conveniently deposited according to needs. The whole process is simple, short and efficient, and the purity of the obtained various hydroxides is also higher.

⑤ In the present invention, the aforementioned chlorine-containing inorganic acid mixed solution can be used as the anode solution, and water as the cathode solution. $Fe(OH)_2$, $Ca(OH)_2$, $Mg(OH)_2$ and other compounds can be separated from the mixed solution by installing a salt bridge or using a cation exchange membrane for electrolytic deposition.

⑥ The hydroxide deposited by the technical solution of the present invention can be converted into oxides by calcination, which avoids the formation of serious hydrochloric acid or sulfuric acid gas by the calcination of aluminum chloride and aluminum sulfate in other technologies. Moreover, the deposited hydroxides and calcined oxides have very small particle sizes, and can be used as powder functional materials or raw materials for ceramics and metallurgical industries after proper treatment.

⑦ The chlorine and hydrogen discharged during the electrolysis process of the present invention can be reused by synthesizing hydrochloric acid again, avoiding the problem of large acid consumption; the final electrolytic waste liquid can be reused after precipitation and purification; the secondary solid waste is rarely generated, and the environmental protection effect is good.

Note: Since the chemical composition and phase composition of the evaporative sediment and the undissolved residue in each example are relatively close, they will not be shown in the following embodiment diagrams to avoid excessive repetition. It is given only when there are special phenomena in the chemical composition or phase composition.

Figure 3:
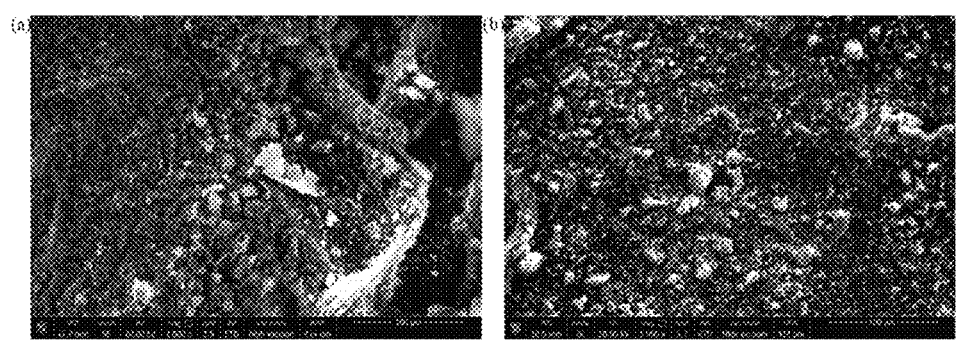
Figure 4:
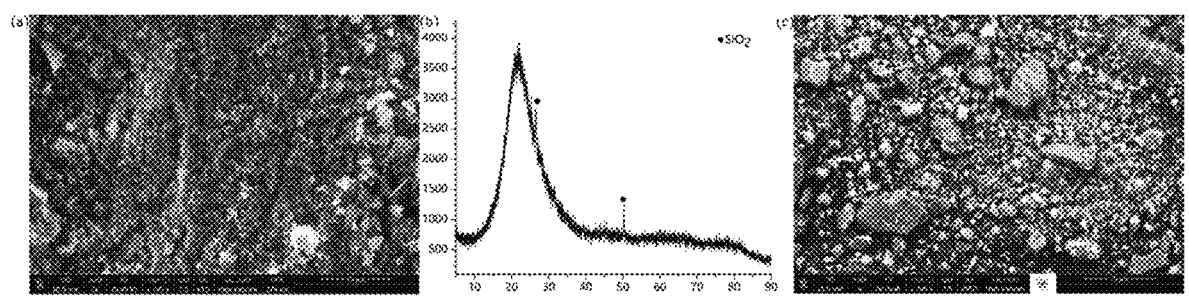
Figure 5:
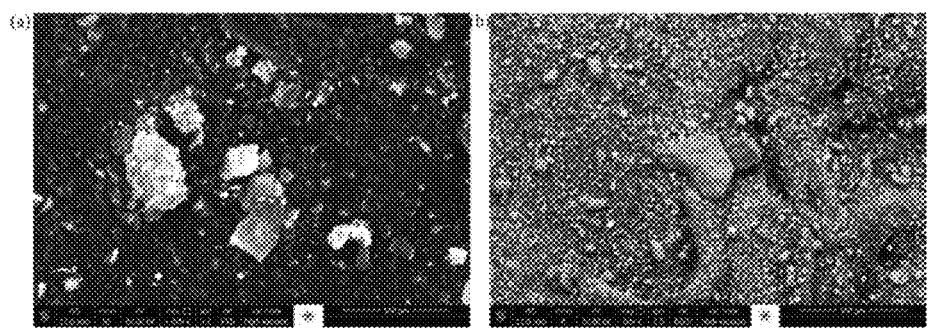

FIG. 3 is the morphology of evaporated silicon oxide (a) and undissolved residual slag (b) in Example 2 of the present invention;

FIG. 4 is the morphology (a) and phase composition (b) of the evaporated silicon oxide and the morphology (c) of the undissolved residual slag in Example 3 of the present invention;

FIG. 5 is the morphology of the evaporated silicon oxide (a) and the undissolved residue (b) in Example 5 of the present invention.

DETAIL DESCRIPTION OF THE INVENTION

Example 1

In this example, 200 g of coal fly ash was used. The mass ratio of coal fly ash, hydrochloric acid, hydrofluoric acid, sulfuric acid, ethanol and water was 10:30:12:5:10:35, and the concentration of the raw material hydrochloric acid used was greater than or equal to 36 wt %, the concentration of the raw material hydrofluoric acid used was greater than or equal to 40 wt %, the concentration of the raw material sulfuric acid used was greater than or equal to 95 wt %, the raw material ethanol used was anhydrous ethanol, and the ethanol content was greater than or equal to 99 wt %. The above-mentioned raw materials were added into the reactor together and kept the temperature at 100° C., and stirred and reacted for 1.5 hours under the vapor pressure of 0.1 MPa (equivalent to 1 atmosphere). The silicon oxide deposited by evaporation was colloidal. After drying at 150° C., the purity was 99.85%; the undissolved residue was washed with water and dried at 150° C., the residual amount was 46.3 g, and the silicon oxide content is 91.16%.

The initial hydrogen ion concentration and chloride ion concentration in the acidic multi-ion mixed solution were adjusted to ensure that the cathode releases hydrogen from beginning to end and the anode releases chlorine from beginning to end during the electrolysis process, and various ions in the acidic multi-ion mixed solution remaining in the reactor were measured. The concentration of each component in the acidic multi-ion mixed solution was determined as follows: 23.3 g/L Si, 18.5 g/L Al, 7.3 g/L Fe, 11.1 g/L Ca, 3.4 g/L K, 1.7 g/L Na, 1.6 g/L Mg, 0.1 g/L Ti. The electrochemical deposition method was used to extract the hydroxide step by step, the specific operation is as follows:

During the electrolysis process, the temperature of the electrolytic solution was controlled within the range of 80-90° C. A voltage of 25 V was applied to both ends of the cathode and anode for electrolysis. When the pH of the cathode solution was 0.2, a reverse voltage of 10 V was applied for 5 minutes, the voltage was reduced to 3.0 V and then adjusted it back to the original voltage direction. the voltage was increased to 4.0-5.5 V, iron hydroxide was deposited in the pH range of 2.7-3.1, and the electrolysis was stopped after keeping it for 20 minutes. The sediments were discharged and centrifuged to filter, the filtered solution was returned to the electrolytic tank, and the voltage was increased to 5.5-7.0 V. When the pH of the solution was 5.2-5.6, the aluminum hydroxide was precipitated. After 15 minutes, the electrolysis was stopped, the precipitates were discharged and centrifuged, and the filtered solution was returned to the electrolytic tank. The electrolysis voltage was continuously adjusted to 8.0-10.0V, magnesium hydroxide and calcium hydroxide were deposited when the pH was 11.0-12.7, and the electrolysis was stopped after keeping it for 10 minutes. The sediments were discharged and centrifuged, and the filtered solution was returned to the electrolytic tank. the temperature of the solution was raised to 95° C. for 20 minutes, and silicic acid was precipitated. The sediments were discharged and centrifuged, and the filtrate was sent to waste water for treatment. The precipitates were centrifuged and washed three times to obtain iron hydroxide, aluminum hydroxide, silicic acid, and a mixture of magnesium hydroxide and calcium hydroxide. They were calcined at 650° C. for 3 hours to obtain the corresponding oxides, iron oxide, aluminum oxide and silicon oxide powder, and magnesium oxide and calcium oxide mixed powder. The purity of iron oxide was 99.6 wt %, the purity of aluminum oxide was 98.2 wt %, the purity of silicon oxide was 98.4 wt %, and the purity of the mixed powder of magnesium oxide and calcium oxide was 97.3 wt %. The concentration of each element in the final waste liquid was 35.6 mg/L Si, 91.2 mg/L Al, 25.0 mg/L Fe, 17.0 mg/L Ca, 3.15 g/L K, 1.58 g/L Na, 53.4 mg/L Mg, 16.8 mg/L Ti.

Figure 1:
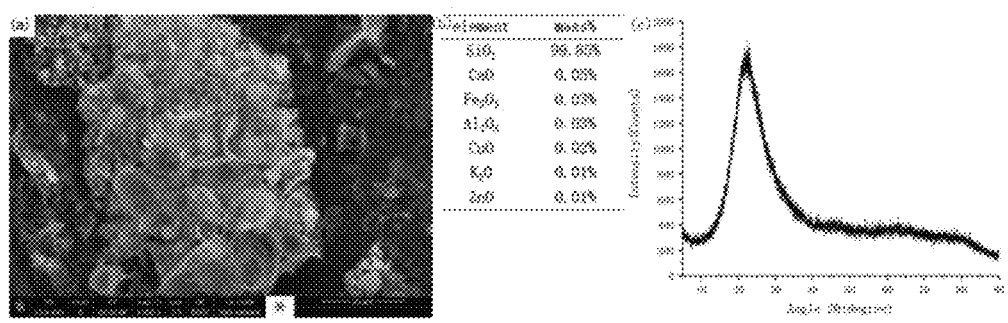
FIG. 1 is the morphology (a), composition (b) and phase composition (c) of the vapor-deposited amorphous silicon oxide in Example 1 of the present invention.
Figure 2:
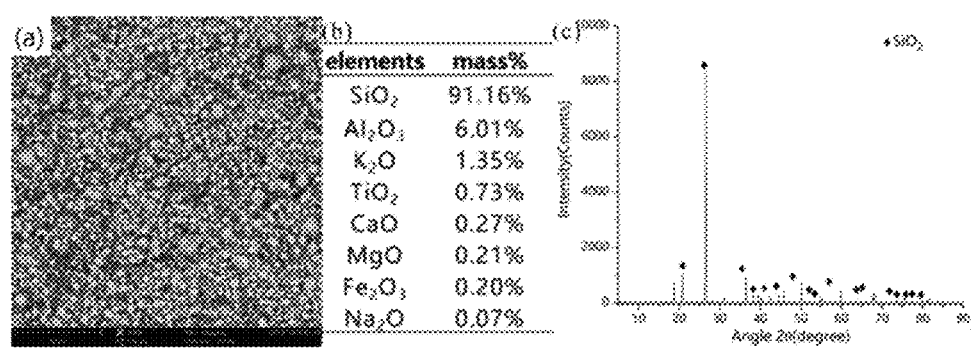
FIG. 2 is the morphology (a), composition (b) and phase composition (c) of the undissolved residue in Example 1 of the present invention.

FIG. 1 shows the morphology (a), composition (b) and phase composition (c) of the amorphous silicon oxide deposited by evaporation in this example, and FIG. 2 shows the morphology (a), composition (b) and phase composition (c) of the undissolved residual slag. It can be seen from the figures that the evaporative deposit is a colloidal structure, the main component is silicon oxide, but contains a small amount of impurities, the deposit is amorphous silicon oxide; and the residual slag impregnated with acid solution is granular, mainly composed of silicon oxide, but contains more impurity elements, the granular residue is silicon oxide crystals.

Example 2

In this example, 200 g of desert sand pulverized powder was used. The mass ratio of desert sand powder, hydrochloric acid, hydrofluoric acid, sulfuric acid, ethanol and water was 15:25:9:10:5:15, and the concentration of the raw material hydrochloric acid used was greater than or equal to 36 wt %, the concentration of the raw material hydrofluoric acid used was greater than or equal to 40 wt %, the concentration of the raw material sulfuric acid used was greater than or equal to 95 wt %, the raw material ethanol used was anhydrous ethanol, and the ethanol content was greater than or equal to 99 wt %. The above-mentioned raw materials were added into the reactor together and kept at 90° C., and stirred and reacted for 2 hours under the vapor pressure of 0.1 MPa. The silicon oxide deposited by evaporation was colloidal. After drying at 150° C., the purity was 99.82%; the undissolved residue was washed with water and dried at 150° C., the residual amount was 128.5 g, and the silicon oxide content was 92.63%. As shown in FIG. 3, the undissolved part was granular and basically a silicon oxide crystal phase.

The initial hydrogen ion concentration and chloride ion concentration in the acidic multi-ion mixed solution were adjusted to ensure that the cathode releases hydrogen from beginning to end and the anode releases chlorine from beginning to end during the electrolysis process, and various ions in the acidic multi-ion mixed solution remaining in the reactor were measured. The concentration of each component in the acidic multi-ion mixed solution was determined as follows: 14.7 g/L Si, 7.1 g/L Al, 2.6 g/L Fe, 1.2 g/L Ca, 1.9 g/L K, 1.2 g/L Na, 0.5 g/L Mg, 0.1 g/L Ti, 0.1 g/L P. The electrochemical deposition method was used to extract the hydroxide step by step, the specific operation is as follows:

During the electrolysis process, the temperature of the electrolytic solution was controlled within the range of 70-80° C. A voltage of 25 V was applied across the cathode and anode for electrolysis. When the pH of the solution was 0.5, the voltage was lowered and changed in the range of 4.0-6.0 V to maintain the pH value of the cathode solution in the range of 2.6-3.2, and the electrolysis was stopped 10 minutes after the iron hydroxide was deposited. The sediments were discharged and centrifuged, and the filtered solution was returned to the electrolytic tank. The voltage was increased and changed in the range of 5.5-7.5 V to maintain the pH value of the cathode solution within the range of 5.5-6.0. After 15 minutes of precipitation of aluminum hydroxide, the electrolysis was stopped, the precipitates were discharged and centrifuged, and the filtered solution was returned to the electrolytic tank. The voltage continues to be increased and changed in the range of 8.0-10.0V to maintain the pH value of the cathode solution in the range of 11.0-12.7, magnesium hydroxide and calcium hydroxide were deposited, and the electrolysis was stopped after 10 minutes. The sediments were discharged and centrifuged, and the filtered solution was returned to the electrolytic tank. The temperature of the solution was raised to 90° C. for 35 minutes to precipitate a silicic acid precipitate. The sediments were discharged and centrifuged, and the filtrate was sent to waste water for treatment. Each precipitate was centrifuged and washed three times with water to obtain iron hydroxide, aluminum hydroxide, silicic acid, and a mixture of magnesium hydroxide and calcium hydroxide. They were calcined at 650° C. for 3 hours to obtain the corresponding oxides, iron oxide, aluminum oxide and silicon oxide powder, and a mixed powder of magnesium oxide and calcium oxide. The purity of iron oxide was 99.3 wt %, and the purity of aluminum oxide was 98.7 wt %, the purity of silicon oxide was 98.0 wt %, and the purity of the mixed powder of magnesium oxide and calcium oxide was 97.5 wt %. The concentration of each element in the final waste liquid was 42.8 mg/L Si, 62.7 mg/L Al, 31.3 mg/L Fe, 25.4 mg/L Ca, 1.51 g/L K, 1.17 g/L Na, 45.5 mg/L Mg, 21.6 mg/L Ti.

Example 3

In this example, 200 g of iron tailing pulverized powder was used. The mass ratio of iron tailing powder, hydrochloric acid, hydrofluoric acid, sulfuric acid, ethanol and water was 15:35:11:7:8:20, and the concentration of the raw material hydrochloric acid used was greater than or equal to 36 wt %, the concentration of the raw material hydrofluoric acid used was greater than or equal to 40 wt %, the concentration of the raw material sulfuric acid used was greater than or equal to 95 wt %, the raw material ethanol used was anhydrous ethanol, and the ethanol content was greater than or equal to 99 wt %. The above-mentioned raw materials were added into the reactor together and kept at 140° C., and stirred and reacted for 0.5 hours under the vapor pressure of 0.3 MPa. The silicon oxide deposited by evaporation was flocculent. After drying at 150° C., the purity was 99.86%; the undissolved residue was washed with water and dried at 150° C., the residual amount was 86.5 g, and the silicon oxide content was 92.87%. As shown in FIG. 4, the sediment has a flocculent structure with crystalline phases, all of which are silicon oxide components.

The initial hydrogen ion concentration and chloride ion concentration in the acidic multi-ion mixed solution were adjusted to ensure that the cathode releases hydrogen from beginning to end and the anode releases chlorine from beginning to end during the electrolysis process, and various ions in the acidic multi-ion mixed solution remaining in the reactor were measured. The concentration of each component in the acidic multi-ion mixed solution was determined as follows: 16.4 g/L Si, 5.6 g/L Al, 2.2 g/L Ca, 4.6 g/L Fe, 1.2 g/L Ti, 0.9 g/L Mn, 0.2 g/L K, 0.1 g/L Na. The electrochemical deposition method was used to extract the hydroxide step by step, the specific operation is as follows:

During the electrolysis process, the temperature of the electrolytic solution was controlled within the range of 80-90° C. A voltage of 25 V was applied to both ends of the anode and cathode for electrolysis, when the pH of the solution was 0.2, the voltage was reduced to 4.0-5.0 V, titanium hydroxide was deposited in the range of pH 0.8-1.2, holded for 10 minutes, the electrolysis was stopped. The sediments were discharged and centrifuged, and the filtered solution was returned to the electrolytic tank. A voltage of 4.0-5.0 V was maintained to maintain the pH value of the cathode solution within the range of 2.6-3.0. After depositing iron hydroxide for 15 minutes, the electrolysis was stopped, the precipitates were discharged and centrifuged, and the filtered solution was returned to the electrolytic tank. The voltage was increased and changed in the range of 5.5-7.5 V to maintain the pH value of the cathode solution in the range of 5.8-6.2, the electrolysis was stopped after 10 minutes of precipitation of aluminum hydroxide, the precipitates were discharged and filtered by centrifugation, and the filtered solution was returned to the electrolytic tank. The voltage continues to be increased and changed in the range of 8.0-10.0V to maintain the pH value of the cathode solution in the range of 11.0-12.0, the compound of manganese hydroxide and calcium hydroxide was deposited, and the electrolysis was stopped after 5 minutes. The sediments were discharged and centrifuged, and the filtered solution was returned to the electrolytic tank. The temperature of the liquid was raised to 100° C. for 10 minutes, and silicic acid was precipitated. The sediments were discharged and centrifuged, and the filtrate was sent to waste water for treatment. Each precipitate was centrifuged and washed three times with water to obtain titanium hydroxide, iron hydroxide and aluminum hydroxide, silicic acid, and a mixture of manganese hydroxide and calcium hydroxide. They were calcined at 650° C. for 3 hours to obtain corresponding oxides, titanium oxide, iron oxide, aluminum oxide and silicon oxide powder, and manganese oxide and calcium oxide mixed powder. The purity of titanium oxide was 99.7 wt %, the purity of iron oxide was 99.1 wt %, the purity of alumina was 97.8 wt %, the purity of silicon oxide was 98.0 wt %, the purity of manganese oxide and calcium oxide mixed powder was 98.3 wt %. The concentration of each element in the final waste liquid was 82.7 mg/L Si, 94.8 mg/L Al, 40.6 mg/L Ca, 57.1 mg/L Fe, 31.8 mg/L Ti, 48.4 mg/L Mn, 149.3 mg/L K, 85.8 mg/L Na.

Example 4

In this example, 200 g of red mud pulverized powder was used. The mass ratio of red mud powder, hydrochloric acid, hydrofluoric acid, sulfuric acid, ethanol and water was 10:33:6:8:6:25, and the concentration of the raw material hydrochloric acid used was greater than or equal to 36 wt %, the concentration of the raw material hydrofluoric acid used was greater than or equal to 40 wt %, the concentration of the raw material sulfuric acid used was greater than or equal to 95 wt %, the raw material ethanol used was anhydrous ethanol, and the ethanol content was greater than or equal to 99 wt %. The above-mentioned raw materials were added into the reactor together and kept at 100° C., and stirred and reacted for 1.5 hours under the vapor pressure of 0.1 MPa. The silicon oxide deposited by evaporation was flocculent and colloidal. After drying at 150° C., the purity was 99.85%; the undissolved residue was washed with water and dried at 150° C., the residual amount was 75.2 g, and the silicon oxide content was 91.9%.

The initial hydrogen ion concentration and chloride ion concentration in the acidic multi-ion mixed solution were adjusted to ensure that the cathode releases hydrogen from beginning to end and the anode releases chlorine from beginning to end during the electrolysis process, and various ions in the acidic multi-ion mixed solution remaining in the reactor were measured. The concentration of each component in the acidic multi-ion mixed solution was determined as follows: 6.7 g/L Si, 4.8 g/L Al, 1.3 g/L Ca, 12.0 g/L Fe, 0.3 g/L K, 0.1 g/L Na, 0.5 g/L Mg. The electrochemical deposition method was used to extract the hydroxide step by step, the specific operation is as follows:

During the electrolysis process, the temperature of the electrolytic solution was controlled within the range of 80-90° C. A voltage of 25 V was applied to both ends of the cathode and anode for electrolysis. When the pH of the solution was 0.5, the electrolysis was stopped, another cathode electrolysis pool was started, and the water temperature was controlled within the range of 80-90° C. The applied voltage on the cathode and the foregoing anode was changed in the range of 6.5-8.5 V, so that the pH value of the cathode aqueous solution was maintained in the range of 8.0-9.0, and the electrolysis was stopped 25 minutes after the ferrous hydroxide was deposited. The sediments were discharged and centrifuged, and the filtered solution was returned to the cathode pool. The voltage was increased to 9.5-10.0V to maintain the pH value of the cathode aqueous solution above 11.0, magnesium hydroxide and calcium hydroxide were deposited, and the electrolysis was stopped after 10 minutes. The precipitates were discharged and centrifuged, and the filtered solution was diluted and returned to the aforementioned electrolytic tank. The aforementioned electrolytic pool was restarted, the voltage was increased and changed in the range of 7.0-8.5 V to maintain the pH value of the cathode solution in the range of 6.0-6.5, the electrolysis was stopped after 10 minutes of precipitation of aluminum hydroxide. The sediments were discharged and centrifuged, and the filtered solution was returned to the electrolytic tank. the liquid temperature was raised to 100° C. and kept for 20 minutes, the silicic acid precipitate was deposited, the precipitate was discharged and centrifuged and filtered, and the filtrate was sent to waste water for treatment. Each precipitate was centrifuged and washed three times with water to obtain a mixture of ferrous hydroxide, aluminum hydroxide, silicic acid, and magnesium hydroxide and calcium hydroxide. They were calcined at 650° C. for 3 hours to obtain the corresponding oxides, iron oxide, aluminum oxide and silicon oxide powder, and mixed powder of magnesium oxide and calcium oxide. The purity of iron oxide was 99.8 wt %, and the purity of aluminum oxide was 99.3 wt %, the purity of silicon oxide was 98.4 wt %, and the purity of the mixed powder of magnesium oxide and calcium oxide was 99.5 wt %. The concentration of each element in the final waste liquid was 98.5 mg/L Si, 61.3 mg/L Al, 28.1 mg/L Fe, 21.2 mg/L Ca, 197.5 mg/L K, 74.4 mg/L Na, 25.9 mg/L Mg.

The process flow of this example is slightly more complicated than the process flow of other examples, but the purity of the obtained iron oxide, magnesium oxide, calcium oxide and aluminum oxide is relatively high.

Example 5

In this example, 200 g of coal gangue pulverized powder was used. The mass ratio of coal gangue powder, hydrochloric acid, hydrofluoric acid, sulfuric acid, ethanol and water was 12:32:10:5:5:30, and the concentration of the raw material hydrochloric acid used was greater than or equal to 36 wt %, the concentration of the raw material hydrofluoric acid used was greater than or equal to 40 wt %, the concentration of the raw material sulfuric acid used was greater than or equal to 95 wt %, the raw material ethanol used was anhydrous ethanol, and the ethanol content was greater than or equal to 99 wt %. The above-mentioned raw materials were added into the reactor together and kept at 120° C., and stirred and reacted for 1 hours under the vapor pressure of 0.2 MPa. The silicon oxide deposited by evaporation was flocculent. After drying at 150° C., the purity was 99.80%; the undissolved residue was washed with water and dried at 150° C., the residual amount was 103.6 g, and the silicon oxide content was 92.3%. As shown in FIG. 5, the sediments are mainly flocculent structures with a small amount of crystalline phases, all of which are determined to be silica components.

The initial hydrogen ion concentration and chloride ion concentration in the acidic multi-ion mixed solution were adjusted to ensure that the cathode releases hydrogen from beginning to end and the anode releases chlorine from beginning to end during the electrolysis process, and various ions in the acidic multi-ion mixed solution remaining in the reactor were measured. The concentration of each component in the acidic multi-ion mixed solution was determined as follows: 17.3 g/L Si, 10.2 g/L Al, 1.8 g/L Ca, 1.2 g/L Fe, 1.0 g/L K, 0.6 g/L Na, 1.5 g/L Mg. The electrochemical deposition method was used to extract the hydroxide step by step, the specific operation is as follows:

During the electrolysis process, the temperature of the electrolytic solution was controlled within the range of 60-80° C. A voltage of 15 V was applied to both ends of the cathode and anode for electrolysis. When the pH of the solution was 0.4, a reverse voltage of 10 V was applied. After keeping it for 5 minutes, the voltage was reduced to 2.0 V and adjusted back to the original voltage direction. The voltage was increased and changed in the range of 4.0-5.0 V to maintain the pH of the cathode solution in the range of 2.6-3.0, and the electrolysis was stopped after 10 minutes of depositing iron hydroxide. The sediments were discharged and centrifuged, and the filtered solution was returned to the electrolytic tank. The voltage was increased and changed in the range of 5.5-7.5 V to maintain the pH value of the cathode solution within the range of 5.8-6.2, the electrolysis was stopped after precipitating aluminum hydroxide for 20 minutes. The sediments were discharged and centrifuged, and the filtered solution was returned to the electrolytic tank. The voltage continues to be increased and changed in the range of 8.5-10.0V to maintain the pH value of the cathode solution in the range of 11.0-12.7, magnesium hydroxide and calcium hydroxide were deposited, the electrolysis was stopped after 5 minutes. The sediments were discharged and centrifuged, and the filtered solution was returned to the electrolytic tank. The liquid temperature was raised to 90° C. and kept for 40 minutes, the silicic acid precipitates were deposited, the precipitates were discharged and centrifuged, and the filtrate was sent to waste water for treatment. Each precipitate was centrifuged and washed three times with water to obtain a mixture of iron hydroxide, aluminum hydroxide, silicic acid, and magnesium hydroxide and calcium hydroxide. The precipitates were calcined at 650° C. for 3 hours to obtain the corresponding oxides, iron oxide, aluminum oxide and silicon oxide powder, and mixed powder of magnesium oxide and calcium oxide. The purity of iron oxide was 99.1 wt %, and the purity of aluminum oxide was 99.1 wt %. The purity of the silicon oxide was 98.3 wt %, the purity of the silicon oxide was 98.7 wt %, and the purity of the mixed powder of magnesium oxide and calcium oxide was 97.3 wt %. The concentration of each element in the final waste liquid was 121.3 mg/L Si, 46.6 mg/L Al, 52.0 mg/L Fe, 68.4 mg/L Ca, 796.0 mg/L K, 453.8 mg/L Na, 28.4 mg/L Mg.

Example 6

400 mL of the dissolving liquid of waste residue after dewaxing of coal powder was used (the dissolving liquid in this example is the leaching liquid of waste residue after dewaxing of chlorinated inorganic acid coal powder. The initial hydrogen ion concentration and chloride ion concentration in the dissolving liquid should be ensured during the electrolysis process. The cathode releases hydrogen from beginning to end, and the anode releases chlorine from beginning to end.), the main components in the solution are: 6.7 g/L Si, 12.4 g/L Al, 5.1 g/L Fe, 8.2 g/L Ca, 1.2 g/L K, 0.2 g/L Na, 0.3 g/L Mg. The electrochemical deposition method was used to extract the hydroxide step by step, the specific operation is as follows:

During the electrolysis process, the temperature of the electrolytic solution was controlled within the range of 60-80° C. A voltage of 20 V was applied at both ends of the cathode and anode for electrolysis, when the pH of the solution was 0.5, the voltage was reduced and changed in the range of 4.5-6.0 V to maintain the pH of the cathode solution within the range of 3.0-3.5, deposit iron hydroxide, the electrolysis was stopped after 15 minutes. The sediments were discharged and centrifuged, and the filtered solution was returned to the electrolytic tank. The voltage was increased and changed in the range of 6.0-7.5 V to maintain the pH value of the cathode solution in the range of 5.5-6.0, the electrolysis was stopped after 10 minutes of precipitation of aluminum hydroxide. The sediments were discharged and centrifuged, and the filtered solution was returned to the electrolytic tank. The voltage continues to be increased and changed in the range of 8.0-10.0V to maintain the pH value of the cathode solution in the range of 11.0-12.7, magnesium hydroxide and calcium hydroxide were deposited, and the electrolysis was stopped after 10 minutes. The sediments were discharged and centrifuged, and the filtered solution was returned to the electrolytic tank. The temperature of the liquid was raised to 95° C. for 50 minutes to precipitate silicic acid precipitates, the precipitates were discharged, centrifuged and filtered, and the filtrate was sended to waste water for treatment. Each precipitate was centrifuged and washed three times with water to obtain a mixture of iron hydroxide, aluminum hydroxide, silicic acid, and magnesium hydroxide and calcium hydroxide. They were calcined at 650° C. for 3 hours to obtain the corresponding oxides, iron oxide, aluminum oxide and silicon oxide powder, and mixed powder of magnesium oxide and calcium oxide. The purity of iron oxide was 98.7 wt %, and the purity of aluminum oxide was 99.2 wt %, the purity of silicon oxide was 98.9 wt %, and the purity of the mixed powder of magnesium oxide and calcium oxide was 97.6 wt %. The concentration of each element in the final waste liquid was 94.2 mg/L Si, 83.6 mg/L Al, 51.9 mg/L Fe, 33.4 mg/L Ca, 1.15 g/L K, 164.8 mg/L Na, 41.1 mg/L Mg.

Example 7

500 mL of the dissolved solution of rare earth flotation tailings powder was used (the solution in this example is the leaching solution of rare earth flotation tailings powder containing chlorine-containing inorganic acid. The initial hydrogen ion concentration and chloride ion concentration in the dissolved solution should be ensured during the electrolysis process. The cathode releases hydrogen from beginning to end, and the anode releases chlorine from beginning to end.), the main components of the solution were: 6.2 g/L Si, 0.6 g/L Al, 6.2 g/L Ca, 13.4 g/L Fe, 5.3 g/L RE(La, Ce), 1.7 g/L Mg, 0.3 g/L K, 0.1 g/L Na, 0.1 g/L Ti, 0.05 g/L Nb, 6.1 g/L F, 0.1 g/L P, 0.1 g/L S. The electrochemical deposition method was used to extract the hydroxide step by step, the specific operation is as follows:

During the electrolysis process, the temperature of the electrolytic solution was controlled within the range of 70-80° C. A voltage of 20 V was applied at both ends of the cathode and anode for electrolysis, when the pH of the solution was 0.2, a reverse voltage of 10 V was applied. After maintaining for 5 minutes, the voltage was reduced to 2.0 V and adjusted back to the original voltage direction. The voltage was increased and changed in the range of 4.5-5.5 V to maintain the pH value of the cathode solution within the range of 1.0-1.3. After depositing rare earth hydroxide for 15 minutes, the electrolysis was stopped, the precipitates were discharged and centrifuged, and the filtered solution was returned to the electrolytic tank. The voltage was increased and changed in the range of 5.5-7.5 V to maintain the pH value of the cathode solution in the range of 5.8-6.5, the electrolysis was stopped after 30 minutes of precipitation of iron hydroxide and aluminum hydroxide. The sediments were discharged and centrifuged, and the filtered solution was returned to the electrolytic tank. The voltage continues to be increased and changed in the range of 8.0-10.0V to maintain the pH value of the cathode solution in the range of 11.0-12.7, magnesium hydroxide and calcium hydroxide were deposited, holded for 10 minutes and then the electrolysis was stopped. The sediments were discharged and centrifuged, and the filtered solution was returned to the electrolytic tank. The temperature of the solution was raised to 80° C. and kept for 60 minutes, the silicic acid precipitate was deposited, the precipitate was discharged and centrifuged, and the filtrate was sent to waste water for treatment. Each precipitate was centrifuged and washed three times with water to obtain rare earth hydroxide, a mixture of iron hydroxide and aluminum hydroxide, silicic acid, and a mixture of magnesium hydroxide and calcium hydroxide. They were calcined at 650° C. for 3 hours to obtain the corresponding oxides, rare earth oxide, mixed powder of iron oxide and aluminum oxide, silicic acid, and mixed powder of magnesium oxide and calcium oxide. The purity of rare earth oxide was 98.7 wt %. The purity of iron and aluminum oxide was 98.5 wt %, the purity of silicon oxide was 94.4 wt %, and the purity of the mixed powder of magnesium oxide and calcium oxide was 97.6 wt %. The concentration of each element in the final waste liquid was 63.9 mg/L Si, 79.2 mg/L Al, 76.6 mg/L Fe, 45.7 mg/L Ca, 41.4 mg/L RE, 56.3 mg/L Mg, 263.1 mg/L K, 78.4 mg/L Na, 22.8 mg/L Ti.

The invention claimed is:

1. A method for stepwise extraction of silica and hydroxide from silicate substances, the method comprising:
   putting a raw material of silicon-containing inorganic solid waste or silicon-containing natural sand powder into a reactor, and adding mixed acid as a leaching solution composed of chlorine containing inorganic acid X, inorganic acid Y, inorganic acid Z, water-soluble alcohol and water, said leaching solution is heated and reacted under the condition of greater than or equal to 0.1 MPa, after the reaction, filtered to obtain an acidic multi-ion mixed solution and filter residue;
   heating and boiling the acidic multi-ion mixed solution and collecting with a collector silicon-containing volatile components, the silicon-containing volatile components are decomposed and deposited in the collector, and the remaining acidic multi-ion mixed solution is cooled for standby use;
   drying amorphous silica dioxide decomposed and deposited in the collector to obtain high purity silica powder;
   washing and drying the filter residue to obtain silica;
   extracting the remaining acidic multi-ion mixed solution by electrochemical deposition method to obtain hydroxide.

2. The method for stepwise extraction of hydroxide from silicate substances according to claim 1 wherein the silicon-containing inorganic solid waste is one or a combination of coal fly ash, coal gangue, red mud, metallic tailings and non-metallic tailings; and the natural sand powder is one or a combination of desert sand, river sand and clay.

3. The method for stepwise extraction of silica and hydroxide from silicate substances according to claim 1, wherein the mass ratio of the powder raw material, inorganic acid X, inorganic acid Y, inorganic acid Z, water-soluble alcohol, and water is (10-15):(25-35):(6-12):(5-10):(5-10):(15-35).

4. The method for stepwise extraction of silica and hydroxide from silicate substances according to claim 1, wherein the inorganic acid X is hydrochloric acid, and the inorganic acid Y is hydrofluoric acid, the inorganic acid Z is sulfuric acid, the water-soluble alcohol is ethanol; the concentration of the hydrochloric acid is greater than or equal to 36 wt %, the concentration of the hydrofluoric acid is greater than or equal to 40 wt %, and the concentration of the sulfuric acid is greater than or equal to 95 wt %; The ethanol is anhydrous ethanol, and the ethanol content is greater than or equal to 99 wt %.

5. The method for stepwise extraction of silica and hydroxide from silicate substances according to claim 4, wherein the remaining acidic multi-ion mixed solution includes metal ions and nonmetallic ions wherein the metal ions are two or more of tin ion, titanium ion, rare earth ion, trivalent iron ion, aluminum ion, chromium ion, zinc ion, ferrous ion, manganese ion, magnesium ion and calcium ion, and wherein the nonmetallic ion is silicon-containing ion;
   and wherein said step of extracting the remaining acidic multi-ion is carried out by electrolysis process, during the electrolysis process, the cathode releases hydrogen from beginning to end, and the anode releases chlorine from beginning to end, so that the pH of the acid multi-ion mixed solution gradually rises; as the electrolysis proceeds, the metal ions in the acid multi-ion mixed solution are sequentially deposited in the form of hydroxides in the vicinity of the cathode and wherein hydroxide precipitates produced in each electrolysis stage are separated separately, and then the filtrate is further electrolyzed until all the metal ions in the acidic multi-ion mixed solution are precipitated in the form of hydroxide; finally, the temperature of the electrolyte is raised, so that the silicon-containing ions are precipitated in the form of silicic acid.

6. The method for stepwise extraction of silica and hydroxide from silicate substances according to claim 5, wherein before starting to deposit metal ions, first electrolysis is carried out at a voltage of 15-25V to a pH of 0.2-0.5.

7. The method for stepwise extraction of silica and hydroxide from silicate substances according to claim 6, wherein when the pH value reaches 0.2-0.5, a reverse voltage of 10V is applied and maintained for 5 minutes to make the cations gather at the other end of the electrode, then the voltage is reduced to less than or equal to 3.0V, so that the electrochemical reaction is basically in a stagnant state, the applied voltage continues to remain unchanged, and the original voltage direction is adjusted back to the state of preparation for deposition.

8. The method of stepwise extraction of silica and hydroxide from silicate substances according to claim 6, wherein when depositing titanium ions: electrolyze at a voltage of 4.0-5.0V to a pH of 0.8-1.2 and kept for 10 minutes, the resulting precipitate is titanium hydroxide;
   when depositing rare earth ions: electrolyze at a voltage of 4.5-5.5V to a pH of 1.0-1.3 and kept for 15 minutes, and the resulting precipitate is rare earth hydrate;
   when depositing trivalent iron ions: electrolyze at a voltage of 4.0-7.5V to a pH of 2.6-6.5 and kept for 10-30 minutes, and the resulting precipitate is iron hydroxide;
   when depositing aluminum ions: electrolyze at a voltage of 5.5-8.5V to a pH of 5.2-6.5 and kept for 10-30 minutes, and the resulting precipitate is aluminum hydroxide;
   when depositing ferrous ions: electrolyze at a voltage of 6.5-8.5V to a pH of 8.0-9.0 and kept for 25 minutes, and the resulting precipitate is ferrous hydroxide;
   when depositing calcium ions, magnesium ions or manganese ions: electrolyze at a voltage of 8.0-10.0V to a pH of 11.0-12.7 and kept for 5-10 min, and the resulting precipitate is calcium hydroxide, magnesium hydroxide or manganese hydroxide.

9. The method for stepwise extraction of silica and hydroxide from silicate substances according to claim 5, wherein during said electrochemical deposition the precipitates are centrifuged and washed three times, then calcined at 650° C. for three hours to obtain the corresponding oxides; wherein the temperature of the electrolyte during the electrolysis is 50-100° C.; and the precipitation temperature of the silicic acid precipitation is 80-100° C., and the precipitation time is 10-60 min.

10. The method for stepwise extraction of silica and hydroxide from silicate substances according to claim 1, wherein the pressure inside the reactor is 0.1-0.3 MPa, the reaction temperature inside the reactor is 90-140° C., and the reaction time is 0.5-2 hours;
and wherein drying of said amorphous silica dioxide and the filter residue is carried out at a temperature of 150° C.

* * * * *